3,409,441
PROCESS OF SWEETENING FOODS WITH MALTOL AND SUGAR
Edward F. Bouchard, Northport, Carl P. Hetzel, Bellerose, and Robert D. Olsen, Brooklyn, N.Y., assignors to Chas. Pfizer & Co., Inc., New York, N.Y., a corporation of Delaware
No Drawing. Continuation-in-part of application Ser. No. 310,155, Sept. 19, 1963. This application Oct. 11, 1966, Ser. No. 585,758
3 Claims. (Cl. 99—28)

ABSTRACT OF THE DISCLOSURE

The sugar content of a food is decreased while maintaining the same total sweetness by substituting from 5 to 75 p.p.m. by weight of maltol for up to 15% of the sugar. At these concentrations the maltol potentiates the sweetness without itself contributing flavor.

---

The present application is in part a continuation of copending application Ser. No. 310,155, now abandoned, filed Sept. 19, 1963.

This invention relates to sugar-containing compositions with enhanced sweetness and to processes for their use in foods. More particularly, it is concerned with compositions containing sugar and maltol and with processes for the preparation of sweetened foods more economically comprising replacing part of the sugar ordinarily used with a very much smaller amount of maltol.

Maltol, also known as 2-methyl-3-hydroxy-gamma-pyrone, has been enjoying increased use in enhancing the flavor and aroma of foods. However, maltol has not been known to increase the apparent sweetness of sugar. It has now been discovered that maltol, surprisingly, has a powerful lifting effect on the sweetness of sugar and, as a result, it is possible to replace part of the sugar in sweetening compositions with maltol. Maltol, has been found to actually potentiate the sweetness of sugar without adding a taste of its own and without merely replacing one taste with another. Indeed, maltol, by itself, does not possess a sweet taste. Furthermore, this enhancement of sweetness is so pronounced that as much as 15 parts by weight of sugar in a composition containing 100 parts of sugar can be replaced with only from about 5 parts per million to about 75 parts per million of maltol.

Since the price of sugar represents a significant portion of the total manufacturing cost of many foods, such as, for example, baked goods, candies, carbonated beverages and fruit drinks, the reduced sugar levels in compositions and processes of the instant invention allow significant economic savings to be obtained. For example, consideration might be given to the typical savings obtained on using 10% less sugar in a lemonade formulation: Ordinarily, 800 pounds of sucrose is used to make 1000 gallons of lemonade. At 11 cents a pound, the current market price for sucrose, which tends to fluctuate from time to time, this represents a value of $88 for the sugar. Decreasing the amount of sucrose by 10%, to 720 pounds, results in a new cost of sugar in 1000 gallons of lemonade of $79.20, but the lemonade is less sweet, flatter and more acid to the taste. It is found that, by the process of the instant invention, the addition of 58 grams of maltol to 1000 gallons of lemonade containing the decreased amount of sugar causes such an enhancement in sweetness that the lower sugar-containing lemonade is identical with the original, 10% sugar-containing formulation. At the current maltol market price of $12 a pound, the amount of maltol added represents $1.50 per 1000 gallons of lemonade. Thus, $8.80 saved on lowering the sugar content has been achieved at a net maltol cost of $1.50 and a total net savings of $7.50 per 1000 gallons of lemonade is realized. Other important cost savings achieved by the application of the processes of the instant invention to other sugar-containing foods readily are recognizable.

It is accordingly an object of the instant invention to provide sweetened foods at less cost.

It is a further object of the instant invention to provide means to reduce the cost of sweetened foods while maintaining sweetness at the same level.

These and other objects of the instant invention will be readily achieved through practice of the process which comprises, in essence: A process for decreasing the amount of sugar in a food while maintaining the same total sweetness which comprises replacing 100 parts of said sugar with a composition comprising up to 90 parts of sugar and maltol in an amount to provide from about 5 to about 75 parts per million (p.p.m.) by weight based on said food.

Also contemplated by the instant invention is a process for the preparation of sweetened beverages with decreased sugar content while maintaining the same total sweetness which comprises replacing 100 parts of said sugar with a composition comprising up to 90 parts of sugar and maltol in an amount to provide from about 5 to about 75 p.p.m. based on said beverage.

As specific embodiments, the instant invention contemplates sweetened, acidulated compositions which contain less sugar than ordinarily used but which retain the same sweetness and acidity. Such sweetened, acidulated foods are those wherein for each 100 parts of sugar there has been substituted up to about 90 parts of sugar and maltol in an amount to provide from about 5 to about 75 p.p.m. based on said food and which also contain an acidulating quantity, i.e., from about 0.5 to about 100 parts by weight, based on said sugar, of a food acid. In addition, there are contemplated processes for decreasing the amount of sugar in a sweetened, acidulated food while maintaining the same total sweetness and acidity which comprise replacing 100 parts of said sugar with a composition comprising up to 90 parts of sugar and maltol in an amount to provide from about 5 to about 75 p.p.m. based on said food. As a further specific embodiment of this invention, there is contemplated a process for the preparation of an acidulated, sweetened beverage with decreased sugar content while maintaining the same total sweetness and acidity which comprises replacing 100 parts of said sugar with a composition comprising up to 90 parts of sugar and maltol in an amount to provide from about 5 to about 75 p.p.m. based on said food.

Maltol is a valuable gamma-pyrone which is freely available commercially. It can be prepared, for example, by the combination of fermentation and chemical synthesis processes disclosed and claimed in the U.S. Patent 3,130,204 to B. E. Tate and R. L. Miller, and assigned to the assignee of the instant application. The process disclosed in said patent generally comprises the oxidation of kojic acid, which is obtained by fermentation, to comenic acid, the decarboxylation thereof to pyromeconic acid, treatment thereof with formaldehyde to form 2-hydroxymethyl pyromeconic acid, and reduction thereof to form maltol, 2-methyl-pyromeconic acid.

The term "sugar" used herein and in the appended claims contemplates carbohydrates having a sweet taste and the general formulas, $C_nH_{2n}O_n$, $C_nH_{2n+2}O_n$ or $C_nH_{2n-2}O_{n-1}$. Among the sugars whose sweetening power is enhanced by the addition of maltol in accordance with the instant composition are, for example, fructose, invert sugar, sucrose, glucose, xylose, maltose, rhamnose, galactose, raffinose, lactose, mannitol, sorbitol, xylitol, arabitol, and the like.

The term "acidulated" when used herein and in the appended claims contemplates compositions in which the acidity is introduced as a food acid or is contained naturally as a food acid in one of the components thereof. For example, acidulated sweetening compositions can comprise sugar plus organic acid, said organic acid being added as such, or in a component, for example, in a citrus juice. The organic food acids used for acidulation are, of course, physiologically acceptable. Special mention is made of food acids such as, for example acetic acid, malonic acid, succinic acid, fumaric acid, glutaric acid, malic acid, lactic acid, citric acid, glycolic acid, tartaric acid, gluconic acid, and the like. It will be recognized that these acids are present in many juice products and other foods which are sweetened by the addition of sugar during preparation for consumer use. For example, one or more of the food acids are naturally present in lemon juice, orange juice, pineapple juice, apple juice, wine, and the like.

An important commercial use of the process of the instant invention in the case where a pure food acid is added separately would be illustrated by the preparation of carbonated beverages and fruit-type beverages. These are ordinarily prepared by adding citric acid and sugar (usually enough to provide from 9 to 13% of the total) to the acid-containing fruit juice or flavors.

The manufacturing costs of these foods and beverages are reduced in accordance with the instant invention by replacing part of the sugar with a very small amount of maltol, as will be more fully described hereinafter.

Maltol is a crystalline substance and can be used as such or can be employed in solution in a suitable solvent such as, for example, water. The flavoring compositions contemplated can comprise mixtures of solid sugars and solid maltol or, alternatively, suitable solutions thereof. Furthermore, it is not necessary, in the practice of this process, to premix both ingredients since the addition of sugar may precede or follow the separate addition of maltol.

It will be recognized that, since the novel compositions of this invention comprise up to 90 parts sugar and maltol in an amount to provide from about 5 to about 75 parts by weight based on the food, if desired, only 5%, or more, or even less, of the sugar may be replaced in any given formulation. The amount of maltol to be employed will, of course, depend on the amount of sugar to be replaced but will fall within the stated range. Since maltol itself does not taste sweet, the instant invention does not contemplate a total replacement of sugar but rather a sparing technique where partial replacement of sugar, with attending economic advantage, is attained.

The following examples illustrate the practice of the processes of the instant invention and are not to be construed as limiting the invention in any way, many variations of which are possible without departing from the spirit or scope of the invention.

EXAMPLE I

Fresh lemonade and limeade containing 9.0 percent sugar and 15 p.p.m. maltol were prepared. Control lemonades and limeades containing 9.45% and 10.35% sugar but no maltol were also prepared. When these samples were given to a trained and experienced taste panel, the panel members matched the control and test samples as being equal in sweetness.

EXAMPLE II

Three lemonade samples are prepared with the following compositions, respectively:

|  | I | II | III |
|---|---|---|---|
| Fresh lemon juice, ml | 35 | 35 | 35 |
| 50% Sugar syrup (w./v.), ml | 50 | 45 | 45 |
| Water, ml | 175 | 177 | 177 |
| 1% Maltol solution, ml |  |  | 0.4 |

Each of the three solutions is presented to 7 tasters; 7 out of 7 tasters judged I and III most alike; II is described as less sweet, more acid or flatter.

Thus, it is found that 10%, or 10 parts per hundred parts, of the sugar in the lemonade can be replaced with 15 p.p.m. of maltol based on the beverage, while the acid level is maintained at about 8.4 parts of citric acid per 100 parts of sugar originally taken, and there is obtained lemonade with sweetness and acid taste equivalent to the original sample.

Substantially the same results are obtained when 10 parts per hundred of the sugar are replaced with 25 p.p.m. of maltol based on the beverage.

EXAMPLE III

An acidulated, sweetened mixed fruit-type punch drink is prepared which contains 100 g. of sugar per liter of drink. A second drink is prepared containing 95 g. of sugar per liter. A third drink is prepared containing 95 g. of sugar and 0.015 g. of maltol per liter. The third drink, which contains 15 p.p.m. of maltol, is fully as sweet and acceptable as the first drink; the second drink is less sweet than the first and third. Thus, 100 parts of sugar have been replaced with a composition comprising 95 parts of sugar and $\frac{1}{67}$ part of maltol, or, it can also be said that 5,000 parts of sugar have been replaced with 15 parts of maltol and 1 part of maltol has replaced 333 parts of sugar.

EXAMPLE IV

A mayonnaise-type salad dressing is made, which contains 1% of sugar and 1% of acid as acetic. This is used as a control in an evaluation of the sweetness and acidity of a number of dressings of the same formulation wherein up to 10% of sugar has been replaced and to which maltol has been added in an amount to provide from about 5 to about 75 parts by weight based on said dressing. It is found that the dressings containing less sugar and also containing maltol are fully equivalent to the control dressing.

A particularly efficacious combination comprises 0.95% sugar and maltol in an amount to provide 15 p.p.m. based on the dressing.

The amount of acid in the said dressing is varied from about 0.5 to about 100 parts based on the said sugar. It is found that 100 parts of the sugar can be substituted with up to 90 parts sugar and from about 5 to about 75 parts per million by weight of maltol based on said dressing and the same sweetness and acidity as the control dressing is obtained.

EXAMPLE V

A cherry-flavored beverage was prepared by adding a cherry-flavor extract in equal amounts to the following formulations:

|  | Sample A | Sample B | Sample C |
|---|---|---|---|
| Sucrose, grams | 13.2 | 11.9 | 11.9 |
| Fumaric acid, grams | 0.15 | 0.15 | 0.15 |
| Maltol, p.p.m. | 0 | 0 | 50 |

Sample C was as sweet as Sample A and tasted sweeter than Sample B.

When 75 p.p.m. of maltol are added to Sample B, containing 10% less sugar than Sample A, it is found to taste sweeter than Sample A and sweeter than Sample C.

EXAMPLE VI

Maltol is added to a number of sugars and sugar syrups: sucrose, brown sugar, maple syrup, corn syrup, fructose, invert sugar, glycose, xylose, maltose, rhamnose, galactose, raffinose and lactose. Each of the said sweeteners has been dissolved in water in amounts corresponding to 0.33, and 0.66%, respectively. The amounts of maltol added are 75 p.p.m., and 250 p.p.m. based on total solutions. A portion of each of the said sugar solutions is reserved for use as a control.

Sweetness of the solutions is tested by presenting each to a taste panel, the members of which are requested to state whether there is a positive sweetness, borderline sweetness, or no sweetness present. Maltol is found to definitely enhance the sweetness of the sugars. Maximum enhancement is obtained at the 75 p.p.m. level. At the 250 p.p.m. level, the taste of maltol is apparent.

When this experiment is repeated using 100 p.p.m. of maltol based on total solution, the taste of maltol is apparent.

What is claimed is:

1. A process for decreasing the amount of sugar in a food while maintaining the same total sweetness which comprises substituting up to 15% by weight of said sugar with maltol in an amount to provide from about 5 to about 75 p.p.m. by weight based on said food.

2. The process of claim 1 wherein the food is an acidulated, sweetened beverage.

3. A process for decreasing the amount of sugar in a sweetened, acidulated food while maintaining the same total sweetness and acidity which comprises substituting 100 parts by weight of said sugar with a composition comprising up to 90 parts by weight of sugar and maltol in an amount to provide from about 5 to about 75 p.p.m. by weight based on said food.

References Cited

UNITED STATES PATENTS 2,761,783  9/1956  Ferguson _____ 99—141
3,156,569  11/1964  Griffin et al. _____ 99—140

A. LOUIS MONACELL, Primary Examiner.
S. E. HEYMAN, Assistant Examiner.